July 12, 1966
J. L. GREGG
3,260,915
TRANSISTORIZED POWER SUPPLY WITH PROTECTIVE CIRCUIT
INCORPORATED THEREIN
Filed Dec. 20, 1962
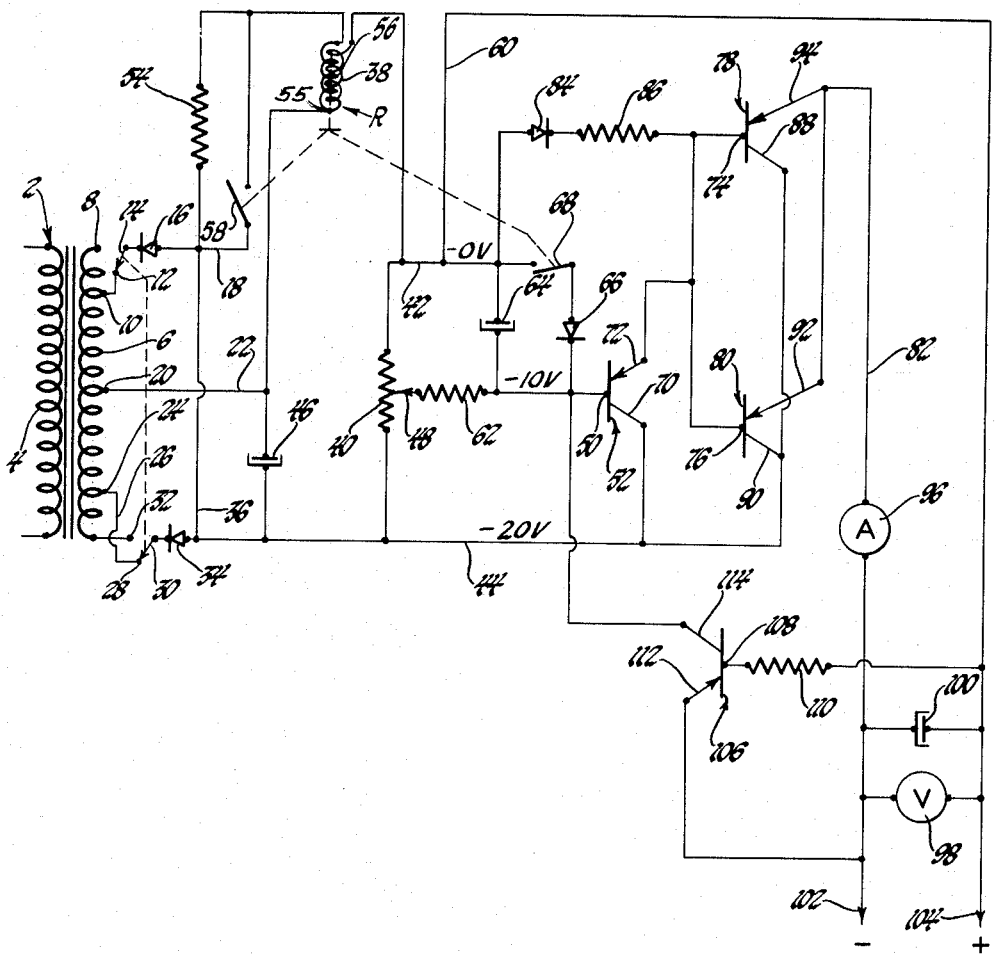
INVENTOR.
*James L. Gregg*
BY
*Robert E. Fowler*
ATTORNEY United States Patent Office 3,260,915
Patented July 12, 1966

3,260,915
TRANSISTORIZED POWER SUPPLY WITH PROTECTIVE CIRCUIT INCORPORATED THEREIN
James L. Gregg, Kokomo, Ind., assignor to General Motors Corporation, Detroit, Mich., a corporation of Delaware
Filed Dec. 20, 1962, Ser. No. 246,122
4 Claims. (Cl. 321—11)

This invention relates to electrical power supply means or converter means providing low voltage direct current power from a high voltage alternating current supply.

There are many instances where low voltage direct current power is needed and the only commercial source available is high voltage alternating current. Batteries, of course, may be used but they have only limited life before either recharging or replacement. Particularly in repair shops or areas in which much work is performed on electronic equipment it is necessary to provide some source of direct current power for many test purposes.

It is, therefore, an object in making this invention to provide an inexpensive transistorized A.C. to D.C. converter.

It is a further object in making this invention to provide a general purpose transistorized power supply for converting 115 volt, 60 cycle power to 10 to 16 volt D.C. power.

It is a still further object in making this invention to provide a transistorized power supply unit protected against battery reversal connections if the same is used to charge a battery.

With these and other objects in view which will become apparent as the specification proceeds, the invention will be best understood by reference to the following specification and claims and the illustrations in the accompanying drawing, in which:

The drawing is a circuit diagram of a power supply system embodying the invention.

Referring more specifically to the drawing there is shown an input transformer 2 having a primary winding 4 which may be connected to a conventional commercial A.C. power source such as is ordinarily available. This transformer 2 steps down the voltage, for example 115 volts, to that desired for the direct current output. In this particular instance it is assumed that two ranges of direct current voltage may be desired, one 0 to 8 and the other 8 to 16. The secondary winding 6 therefor, mounted in inductive relation to the primary, is tapped to provide the necessary ranges. The upper end of the secondary winding 6 is connected directly to a stationary switch contact 8 and a predetermined number of turns down a tap 10 is provided on the secondary winding which is connected to a second stationary contact 12 both of which are engageable with a first movable switch arm 14. The switch arm 14 is connected through a rectifier 16 to conductive line 18. The transformer is also center tapped at 20 which tap is connected directly to conductor 22. Further down a last tap is made at point 24 and this point is connected through line 26 to stationary contact 28 which is engageable by a second movable switch arm 30. The lower end of the secondary winding is connected to stationary contact 32 which likewise is engageable by movable switch arm 30. Switch arm 30 is connected through a second rectifier 34 to tie line 36 which extends to conductor 18. The two movable switch arms 14 and 30 are ganged together to mechanically move and when they are both moved upwardly to engage contacts 8 and 32 the full wave rectifier is connected across the full secondary winding to provide a range of 8–16 volts, whereas when they are both moved to the lower positions to engage contacts 12 and 28 they connect in only a portion of the secondary winding to provide a range of 0–8 volts.

A switching relay R having two windings and operating two switch contacts is provided. Winding 56 having many turns of relatively light wire is connected in series with resistor 54 to common terminal 55. Switch contact 58 is connected in shunt to resistor 54 and short circuits the same when closed. Winding 38 is a few turns of heavy wire having one terminal connected to common terminal 55 and line 22, and the other to one terminal of a potentiometer 40–48. A conductive line 42 extends from relay coil 38 and the potentiometer 40–48 to switch contact 68 which is actuated by said coils.

Line 42 is directly connected to one of the output lines 60 of the power supply. The movable tap 48 on the potentiometer 40 is connected through a limiting resistance 62 to the base 50 of the regulating transistor 52. A filtering condenser 64 is connected directly across between line 42 and the base 50 of the transistor 52. A rectifier 66 is connected in series with the switch contact 68 and both are connected in shunt to the condenser 64. The collector 70 of the first regulating stage transistor 52 is directly connected to line 44 and the emitter electrode 72 of this transistor is connected directly to both base electrodes 74 and 76 of the two transistors 78 and 80 forming the second regulating stage. These two transistors are connected in parallel between line 44 and one of the main output lines 82. A rectifier 84 is connected in series with a limiting resistance 86 from line 42 to the base line for the transistors 78 and 80. The collector electrodes 88 and 90 of the transistors 78 and 80 are connected directly to line 44 and the emitter electrodes 92 and 94 are connected directly to the output line 82. An ammeter 96 to read the output current is connected in the output line 82 and a volt meter 98 to determine output voltage is connected across between the two output lines. A condenser 100 is also connected across the output lines.

In the operation of the device the switch 14–30 is first adjusted to provide the desired voltage range and assuming a selected 8 to 16 volt range, this switch will assume its upper position. By moving the movable tap 48 any final voltage from 8 to 16 volts may be provided across the output terminals 102, 104. The 115 volt, 60 cycle input is applied to the primary of the transformer, stepped down through the same to provide low voltage alternating current on the secondary which develops a D.C. voltage output through the rectifiers 16 and 34 which is applied across the potentiometer coil 40. The condenser 64 connected between positive output lead 60 and the base 50 provides excellent filtering and instantaneous voltage regulation at this point. Assuming that the potentiometer tap 48 is adjusted so as to provide 10 volts differential in the final output, then the exemplary voltages of ground or zero will be developed on the + line or line 42, −10 volts on base 50 of transistor 52, and −20 volts on line 44 and transistor 52 will conduct until the voltage on its emitter 72 is almost equal to the base voltage of −10 volts. Therefore, there are 10 volts drop across the resistor 86 and also across the capacitor 64. Since the bases 74 and 76 of the other two transistors 78 and 80 are connected to the emitter 72 of the first transistor 52 and voltage thereon is also 10 volts less than the positive terminal or line 60 there are 10 volts between the output terminals. This voltage will not drop much even if a heavy load is quickly applied. The voltage across the condenser 64, therefore, controls the output voltage and cannot change quickly since a certain time is required to discharge through the resistor 86. The above is the normal operation of the circuit when providing direct current power from the terminals 102–104.

In the event that a short circuit or heavy overload is applied to these terminals, the relay R with two coils 38 and 56 is so connected that the current through coil 38 is aided by the bias current established by resistor 54 through coil 56, and will be energized. Contacts 68 and 58 both close, the latter causing full voltage to appear across coil 56 thereby keeping the relay R energized. Contact 68 applies full positive voltage through diode 66 to base 50 of the first stage regulator transistor 52 thereby causing the regulator stages to become nonconductive. The unit can again be made operative by removing the overload or short circuit and disconnecting the A.C. line voltage from transformer coil 4.

If terminals 102–104 are connected inadvertently in a manner of opposite polarity of a battery which is to be charged through this circuit, the transistors might be overloaded and burned out. The circuit, therefore, is provided with protective means for blocking current to prevent such possibilities. The protective means is in the form of a transistor shown at 106. Its base electrode 108 is connected through a resistor 110 directly to the positive output line 60. Its emitter electrode 112 is connected directly to negative output line adjacent terminal 102. Its collector electrode 114 is connected directly to the base electrode 50 of the regulating transistor 52. When a battery is connected across the terminals 102–104 with reverse polarity whether the power supply is connected or not to a conventional 60 cycle A.C. source, it appears as a short circuit causing current to cease flowing. Transistor 106 normally nonconductive is forced to conduct since the output terminals 102–104 assume the voltage of the battery. This couples the output regulator emitters 92 and 94 to the first stage regulator base 50 through an obvious circuit from emitters 92, 94, line 82, ammeter 96, emitter 112, body of transistor 106, collector 114 to base 50. This keeps the supply from delivering current to the battery and vice versa. The diodes 66 and 84 are inserted in their respective circuits to keep the stages from being biased full on when the battery is reversed. Under this condition the current in the main power circuit will be substantially cut off and the transistors protected.

As soon as the connections to the battery with the reverse polarity have been removed the system immediately assumes its normal condition and can be properly connected to any load to supply power.

What is claimed is:

1. In a transistorized power supply system, a source of alternating current power, rectifier means connected to said source of alternating current power to convert the same to direct current power, potentiometer means formed of an elongated resistor and an adjustable tap thereon, said resistor being connected to the rectifier means across which the direct current power is applied which can be adjusted by movement of the tap to provide the desired voltage at the output, an output circuit for supplying direct current power to a load, transistorized current control means connected in series between the output circuit and the potentiometer means to control the current flow in the output circuit, transistor regulating means connected to the tap on the potentiometer means and to the transistorized current control means to regulate the flow of current therethrough depending upon the potentiometer tap setting and protective means including further transistor means to protect the transistorized current control means, said protective means being connected between the output circuit and the transistor regulating means, said protective transistor means being normally nonconductive when the system is operating properly to supply direct current of the proper polarity to a load but which becomes conductive upon the application of improper polarity D.C. source to the output circuit to bias the transistor regulating means to cut off current flow in the transistorized current control means as long as the improper polarity source is connected to the output circuit so that the transistorized current control means will not be overloaded.

2. In transistorized converter means for changing alternating to direct current power, a source of alternating current power, transformer means connected to said source of alternating current power for changing to the desired voltage, rectifier and filter means connected in that order to the transformer means to convert the output of the transformer to direct current power and minimize ripple in the same, an output circuit for the direct current power, transistorized current control means in series between the output circuit and the rectifier and filter means to control the direct current power in the output circuit, transistor regulator means connected to the rectifier and filter means and to the transistorized current control means to regulate the voltage in the output circuit to a predetermined intermediate value and protective means including further transistor means connected to the output circuit and to the transistor regulator means, said protective further transistor means being nonconductive under normal converter operation but which becomes conductive if a source of direct current is applied with reversed polarity to the output circuit to cut off the transistor regulator means and block current flow through the converter, so the transistorized current control means will not be overloaded and remain conductive until the reverse polarity source is removed.

3. In transistorized converter means for changing alternating current power to direct current power, a source of alternating current power, rectifying and filtering means connected in that order to said source of alternating current power for changing the same to direct current power and minimizing ripple in the same, a pair of output lines for delivering the direct current power of predetermined polarity to a load, transistorized current control and regulating means connected between the pair of output lines and the rectifying and filtering means to control and regulate the direct current power on said output lines, and protective means including transistor means having an input circuit connected to said output lines and an output circuit connected to the transistorized control and regulating means which last named transistor means is nonconductive during normal operating of the converter in delivering direct current power at the proper polarity but which becomes conductive if the output lines are connected to a source of direct current power at reverse polarity to cut off the transistorized current control and regulating means and protect the same against overloading.

4. In transistorized converter means for changing alternating current power to direct current power, a source of alternating current power, rectifying and filtering means connected in that order to said source of alternating current power for changing the same to direct current power and minimizing ripple in the same, a pair of output lines for delivering the direct current power of predetermined polarity to a load, transistorized current control and regulating means connected between the pair of output lines and the rectifying and filtering means to control and regulate the direct current power in said output lines, and a transistor having base, collector and emitter electrodes, said base and emitter electrodes being connected to said output lines and said collector electrode being connected to said transistorized control and regulating means so that said last mentioned transistor is nonconductive during normal operation of the converter in delivering direct current power at the proper polarity but which becomes conductive if the output lines are connected to a source of direct current power at reverse polarity to cut off the transistorized current control and regulating means and protect the same against overloading.

References Cited by the Examiner

UNITED STATES PATENTS

| | | | |
|---|---|---|---|
| 3,017,564 | 1/1962 | Barney | 323—9 |
| 3,085,187 | 4/1963 | Godshalk. | |
| 3,158,801 | 11/1964 | Tighe | 323—22 |

JOHN F. COUCH, *Primary Examiner.*

LLOYD McCOLLUM, *Examiner.*

H. B. KATZ, *Assistant Examiner.*